United States Patent [19]
Rozman

[11] Patent Number: 5,870,299
[45] Date of Patent: Feb. 9, 1999

[54] METHOD AND APPARATUS FOR DAMPING RINGING IN SELF-DRIVEN SYNCHRONOUS RECTIFIERS

[75] Inventor: Allen Frank Rozman, Richardson, Tex.

[73] Assignee: Lucent Technologies Inc., Murray Hill, N.J.

[21] Appl. No.: 858,181

[22] Filed: May 28, 1997

[51] Int. Cl.$^6$ ................................................ H02M 7/217
[52] U.S. Cl. ................................ 363/127; 363/21; 363/45
[58] Field of Search ................................ 363/15, 39, 16, 363/44, 81, 45, 84, 127, 20, 21, 89

[56] References Cited

U.S. PATENT DOCUMENTS

| | | | |
|---|---|---|---|
| 3,582,758 | 6/1971 | Gunn | 363/127 |
| 3,909,700 | 9/1975 | Ferro | 363/127 |
| 4,519,024 | 5/1985 | Federico et al. | 363/127 |
| 4,716,514 | 12/1987 | Patel | 363/127 |
| 4,922,404 | 5/1990 | Ludwig et al. | 363/81 |
| 5,038,266 | 8/1991 | Callen et al. | 363/89 |
| 5,264,736 | 11/1993 | Jacobson | 307/246 |
| 5,303,138 | 4/1994 | Rozman | 363/21 |
| 5,353,212 | 10/1994 | Loftus, Jr. | 363/17 |
| 5,396,412 | 3/1995 | Barlage | 363/89 |
| 5,590,032 | 12/1996 | Bowman et al. | 363/15 |
| 5,592,071 | 1/1997 | Brown | 323/282 |
| 5,663,877 | 9/1997 | Dittli et al. | 363/127 |

OTHER PUBLICATIONS

Carsten, Bruce, "Design Techniques For Transformer Active Reset Circuits At High Frequencies And Power Levels," *HFPC May 1990 Proceedings*, pp. 235–246.

Blanc, James, "Practical Application Of MOSFET Synchronous Rectifiers," *1991 IEEE*, pp. 495–501.

Kassakian, John G. et al, "High–Frequency High–Density Converters For Distributed Power Supply Systems," *1988 IEEE*, 15 pgs.

Kagan, Richard S. et al, "Improving Power Supply Efficiency With MOSFET Synchronous Rectifiers," *Power Concepts, Inc. 1982*, pp. 1–5.

Jitaru, Ionel Dan et al, "Quasi–Integrated Magnetic An Avenue For Higher Power Density And Efficiency In Power Converters," *1997 IEEE*, pp. 395–402.

Jovanovic, Milan M. et al, "Evaluation Of–Rectification Efficiency Improvement Limits In Forward Converters," *1995 IEEE*, pp. 387–395.

Ji, H.K. et al, "Active Clamp Forward Converter With MOSFET Synchronous Rectification," *1994 IEEE*, pp. 895–901.

Cobos, J. A. et al, "Comparison Of High Efficiency Low Output Voltage Forward Topologies," *1994 IEEE*, pp. 887–894.

de la Cruz, Enrique et al, "Analysis Of Suitable PWM Topologies To Meet Very High Efficiency Requirements For On Board DC/DC Converters In Future Telecom Systems," *DC/DC Converters: Distributed Power*, pp. 207–214.

Cobos, Jose A. et al, "Active Clamp PWM Forward Converter With Self Driven Synchronous Rectification," *DC/DC Converters: Distributed Power*, pp. 200–206.

(List continued on next page.)

*Primary Examiner*—Adolf Berhane

[57] ABSTRACT

Apparatus and method for eliminating cross conduction of self-driven synchronous rectifiers in power converters caused by non-idealized ringing of parasitic capacitances and inductors. In an exemplary embodiment, the apparatus includes synchronous rectifiers or some hybrid topology having at least one synchronous rectifier coupled to a damping circuit having at least one switching device. The switching device is activated (ON) at a time when at least one of the synchronous rectifiers is supposed to remain inactive (OFF). Accordingly, when the switching device is ON, the device effectively dampens any ringing present at the synchronous rectifier that may cause the rectifier to inappropriately transition ON. The damping circuit of the present invention utilizes the same signals present to control the synchronous rectifier(s) and requires no additional control circuitry. Additionally, the damping circuit dramatically improves the efficiency of self synchronous power converters and is topology independent.

21 Claims, 6 Drawing Sheets

OTHER PUBLICATIONS

Jovanovic, M.M. et al, "Design Considerations For Forward Converter With Synchronous Rectifiers," *PCIM 1993*, pp. 163–173.

Jitaru, Ionel Dan, "The Impact Of Low Output Voltage Requirements On Power Converters," *HFPC—May 1995 Proceedings*, pp. 1–10.

Sakai, Eiji et al, "Synchronous Rectifier For Low Voltage Switching Converter," *1995 IEEE*, pp. 471–475.

*5.6MOSFETs Move In On Low Voltage Rectification (TA84–2)*, 1984, pp. 5–69:5–85.

METHOD AND APPARATUS FOR DAMPING RINGING IN SELF-DRIVEN SYNCHRONOUS RECTIFIERS

FIELD OF THE INVENTION

The present invention relates generally to power converters, and more particularly, to power converters that employ self-driven synchronous rectifiers.

BACKGROUND OF THE INVENTION

Power converters that employ self-driven synchronous rectifiers are becoming increasingly popular in the power industry today, because of their compact size and high efficiency. For instance, one particular class of self-driven synchronous rectifier circuits employing active clamp topologies may attain conversion efficiencies exceeding 90%, (e.g., a 48 V to 5 V DC-to-DC converter).

Nevertheless, the efficiency of self-driven synchronous rectifiers, are often substantially reduced by non-idealized parasitic elements, such as: (1) stray inductances introduced by component interconnections, (2) transformer leakage inductances, (3) body capacitances of the synchronous rectifiers, (4) and other related parasitic phenomena. Such parasitic elements form high frequency resonant circuits which can oscillate (generating a "ringing") as the synchronous rectifier gates transition between ON-and-OFF and OFF-and-ON. As result, during transition periods, the ringing creates a momentary short circuit of the synchronous rectifiers, allowing the synchronous rectifier to simultaneously "cross conduct" for brief periods of time. Such simultaneous conduction (i.e., cross conduction) can be a significant source of power loss and inefficiency for self-driven synchronous rectifiers.

Cross conduction and ringing is becoming more troublesome as power converter designs migrate to very low output voltages (e.g., 1.5 V to 2 V). Low output voltage converters often require the use of low-threshold-voltage type Metal Oxide Silicon Field Effect Transistors (MOSFETs) (typically less than <2.5 volts), because voltages available at the winding terminals of such transformers are no longer sufficient to adequately drive traditional power MOSFETs, (e.g., 10 volt gate drive). Unfortunately, low threshold MOSFETs are considerably more susceptible to cross conduction than conventional 10 volt drive power MOSFETs.

What is needed, therefore, is way to substantially eliminate cross conduction of rectifiers in self-driven synchronous converters without introducing unnecessary circuit complexity or additional parasitic loss mechanisms.

SUMMARY OF THE INVENTION

The present invention is directed an apparatus and method for substantially eliminating unwanted cross conduction of self-driven synchronous rectifiers, in power converters, caused by parasitic ringing.

In a method exemplary embodiment, a self-driven rectifier power converter employs first and second self-driven synchronous devices each having respective activation terminals. During a first time period, when the first self-driven synchronous device is active and the second self-driven synchronous device is inactive, a switching device is activated to dampen any unwanted ringing on the activation terminal of the second self-driven synchronous device. In another exemplary embodiment, a second switching device is employed to dampen any unwanted ringing on the activation terminal of the first self-driven synchronous device by activating the second switching device at the second time period when the first self-driven synchronous device is inactive.

In another exemplary embodiment, an apparatus includes synchronous rectifiers or some hybrid topology having at least one synchronous rectifier coupled to a damping circuit having at least one switching device. The switching device is activated at a time when at least one of the synchronous rectifiers is supposed to remain inactive. Accordingly, when the switching device is active, it effectively dampens any ringing present at the synchronous rectifier that may inadvertently transition the rectifier to activate.

One feature of the present invention is to provide improved efficiency to self-driven synchronous rectifiers, by actively damping unwanted parasitic ringing on the activating terminals of the self-driven synchronous rectifiers. This prevents the rectifiers from conducting at inappropriate times.

Another feature of the present invention is the ability to employ drive signals, already present in synchronous rectifiers, to control the switching device(s). Thus, power converters, that employ the present invention, do not require additional control circuitry and remain self commutating.

Still further, the present invention is topology independent and can be used to improve the performance of any power circuit topology employing self driven synchronous rectifiers with a minimum of added cost and complexity.

Further features and advantages of the present invention, as well as the structure and operation of various embodiments of the present invention, are described in detail below with reference to the accompanying drawings.

BRIEF DESCRIPTION OF THE DRAWINGS

The present invention will be described with reference to the accompanying drawings, wherein.

DETAILED DESCRIPTION OF THE INVENTION

The present invention is directed an apparatus and method for substantially eliminating unwanted cross conduction of self-driven synchronous rectifiers, in power converters, caused by parasitic ringing. FIGS. 5–9 illustrate various exemplary embodiments of the present invention.

Figure 1:
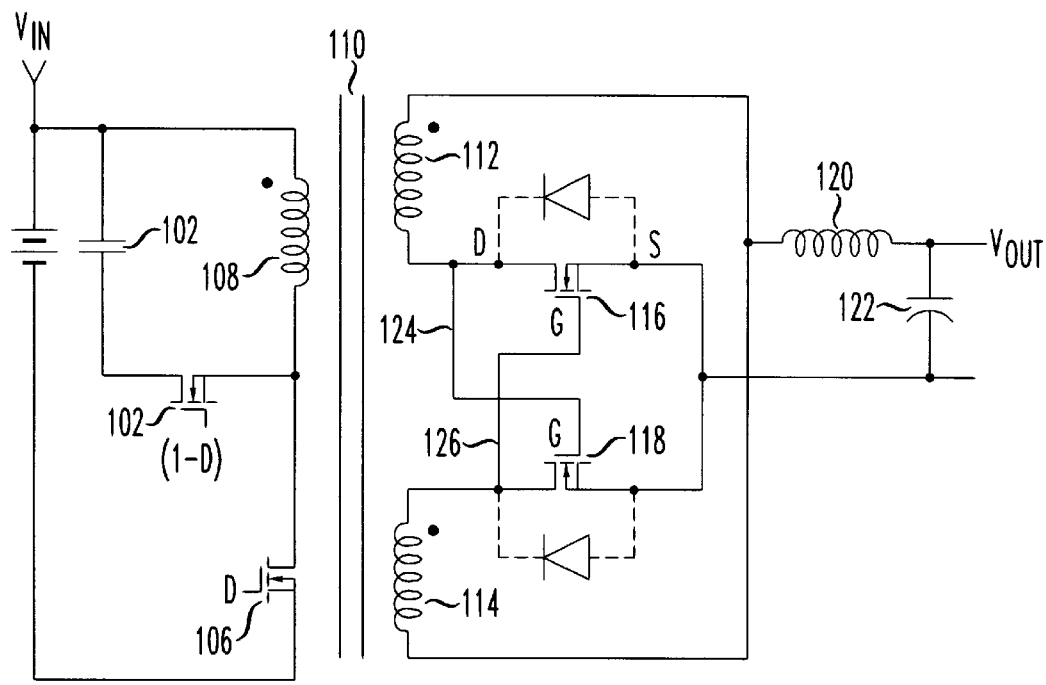
FIG. 1 is a simplified circuit diagram of an exemplary power converter with an active clamp topology.
Figure 2:
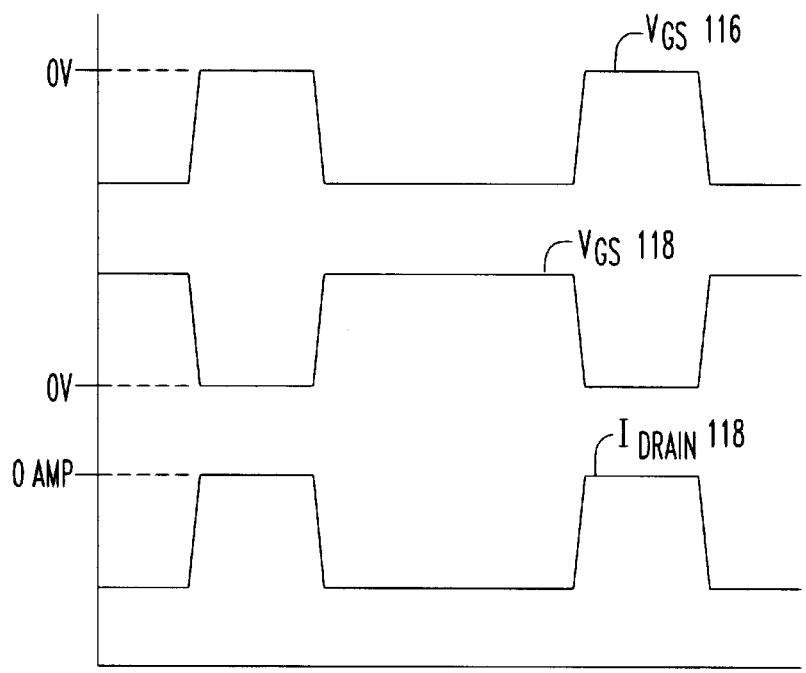
FIG. 2 shows idealized voltage waveforms of gate drive voltages for the gate-to-source voltage $V_{GS}$ of synchronous rectifiers of FIG. 1, as well as an idealized drain current, $I_{DRAIN}$ of a particular rectifier of FIG. 1.

Before referring to these Figures, the problem of cross conduction can be better understood by considering the operation of an example conventional power converter. FIG. 1 is a circuit diagram of an exemplary power converter 100 with an active clamp topology. The power converter 100 includes on the primary side of the transformer 110, an active clamp topology including two switches 104 and 106 and a clamp capacitor 102. The power converter 100 on the secondary side of the transformer 110 employs a center tapped output and includes self-driven synchronous rectifiers 116 and 118 cross connected by their gate G and drain D via lines 124 and 126. This cross connection scheme naturally prevents the two rectifiers 116 and 118 from conducting simultaneously, because as one rectifier 116 or 118 turns ON (its drain to source voltage $V_{GS}$ becomes zero) it automatically shorts the gate G to source S terminals of the other rectifier 116 or 118, thus preventing it from conducting. Simultaneous conduction is therefore not possible in this idealized converter 100. For example, FIG. 2 shows idealized voltage waveforms of gate drive voltages for the gate-to-source voltage $V_{GS}$ of synchronous rectifiers 116 and 118, as well as an idealized drain current, $I_{DRAIN}$ of rectifier 118, shown in FIG. 1. Referring back to FIG. 1, also shown is an output inductor 120 and capacitor 122, but neither are germane to the discussion at hand and are readily understood by those skilled in the art. For a more detailed discussion of such a converter and its operation, please refer to U.S. Pat. No. 5,303,138, entitled *Low Loss Synchronous Rectifier for Application to Clamped-Mode Power Converters*, to Rozman, issued Apr. 12, 1994, commonly assigned and incorporated herein by reference in its entirety.

Figure 3:
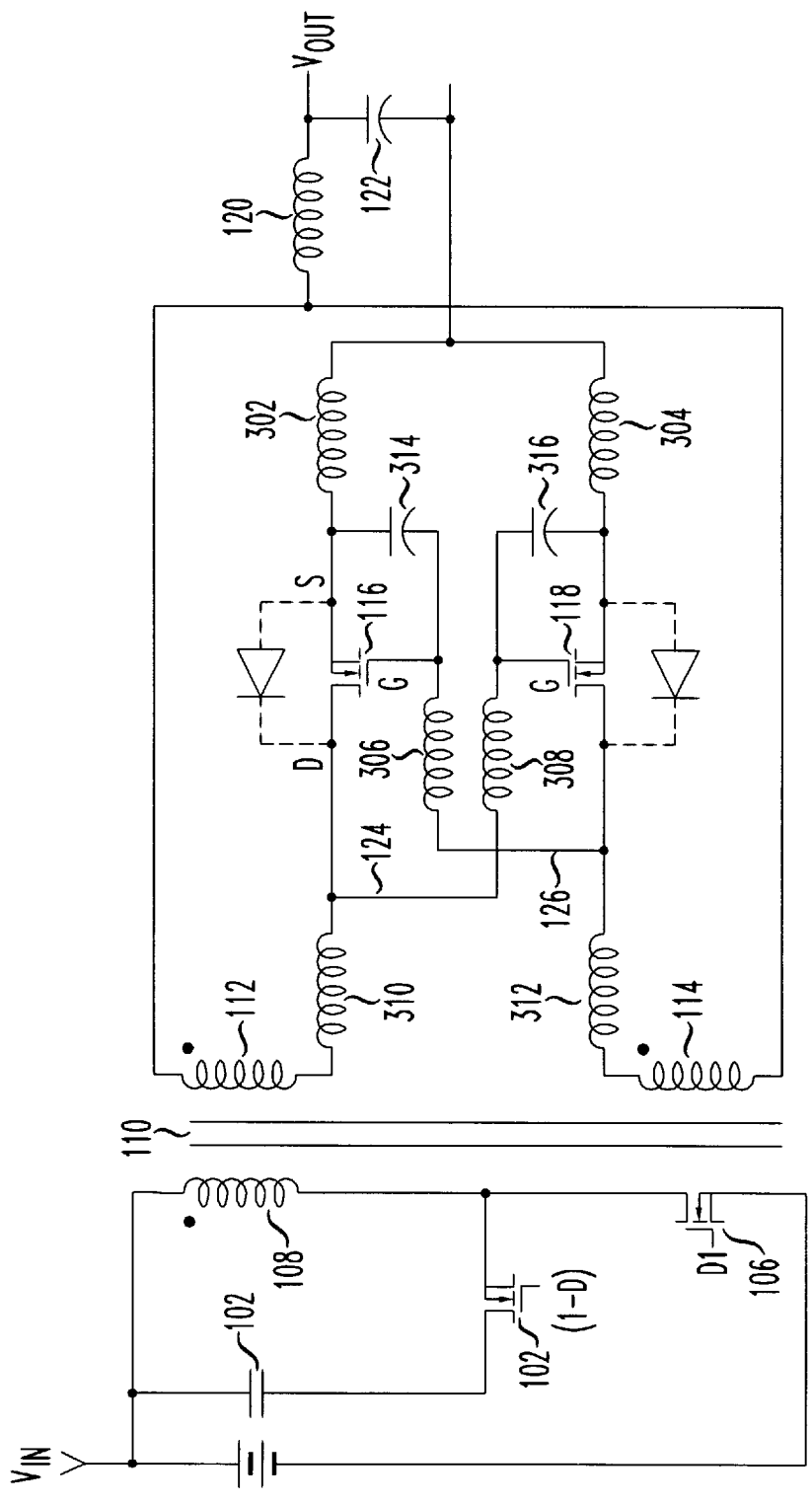
FIG. 3 shows one example of many possible parasitic elements introduced into a practical implementation of the power converter 100 circuit diagram of FIG. 1.

Unfortunately, practical circuits contain parasitic inductances and capacitances, which can dramatically alter the operation of a circuit from its idealized form. FIG. 3 shows one example of many possible parasitic elements 302, 304, 306, 308, 310, 312, 314, 316, introduced into a practical implementation of the power converter 100 circuit diagram of FIG. 1. It should be noted that the parasitic elements elements 302, 304, 306, 308, 310, 312, 314, 316 shown are most pertinent to the present discussion, but many others exist. Of particular importance are the inductances 302, 304, 306, 308, 310, 312 in series with the gate G, drain D and source S terminals, and the gate G to source S and gate G to drain D capacitances 314 and 316 of the rectifiers 116 and 118.

Figure 4:
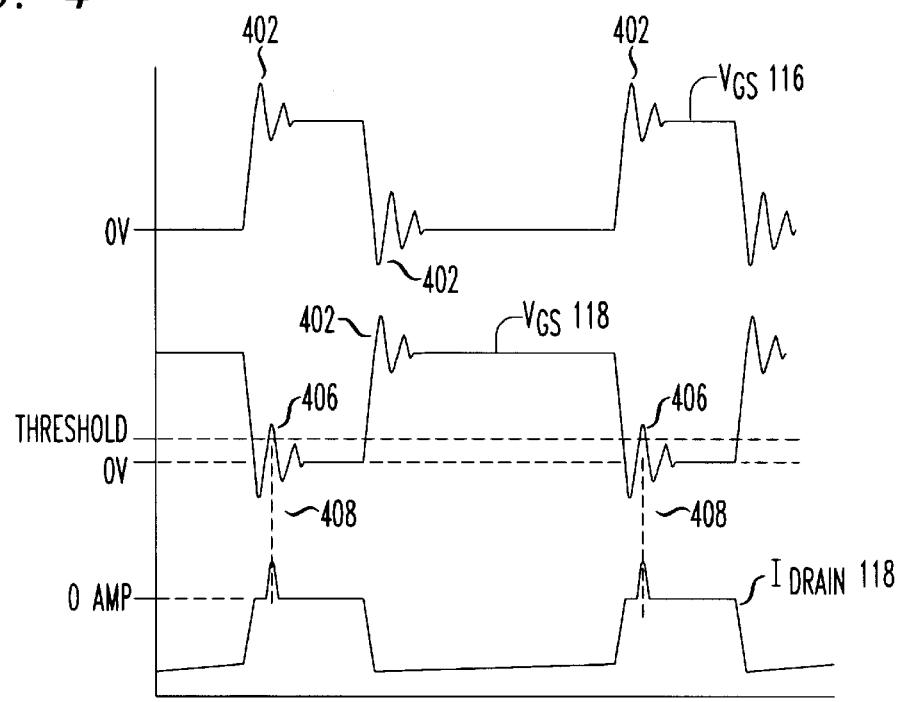
FIG. 4 shows non-idealized voltage waveforms of gate (or activation terminal) drive voltages for the gate-to-source voltage $V_{GS}$ of synchronous rectifiers of FIG. 3 as well as a non-idealized drain current, $I_{DRAIN}$ of one rectifier shown in FIG. 3.

Accordingly, as the gate to source voltages $V_{GS}$ of the rectifiers 116 and 118 transition from low to high (or high to low), the parasitic resonant elements 302, 304, 306, 308, 310, 312, 314, 316 are excited and a "ringing" (e.g., 402 of FIG. 4) occurs on the activation terminals (e.g., gates GS) of the rectifiers 116 and 118. For example, FIG. 4 shows a non-idealized voltage waveforms of gate (activation terminal) drive voltages for the gate-to-source voltage $V_{GS}$ of synchronous rectifiers 116 and 118, as well as a non-idealized drain current, $I_{DRAIN}$ of rectifier 118. While this type of ringing 402 naturally occurs in most power converters, ringing occurring after rectifier 118 turns OFF (inactive) causes the most concern, because the synchronous rectifier 118 can turn back ON (active) if the amplitude of the ring is high enough. Note the drain current $I_{DRAIN}$ 118 during the time a resonant peak 406 exceeds a threshold voltage $V_{THRESHOLD}$ a current spike 408 is realized in the drain current $I_{DRAIN}$ of rectifier 118. Current flow in rectifier 118 is particularly lossy at this time, because the drain voltage of rectifier 118 is at its maximum. As a result, the current spike 408 caused by parasitic ringing 402, and simultaneous conduction during the peaks 406 of the parasitic ringing excitation, can be a significant source of loss in a practical converter 100.

Figure 5:
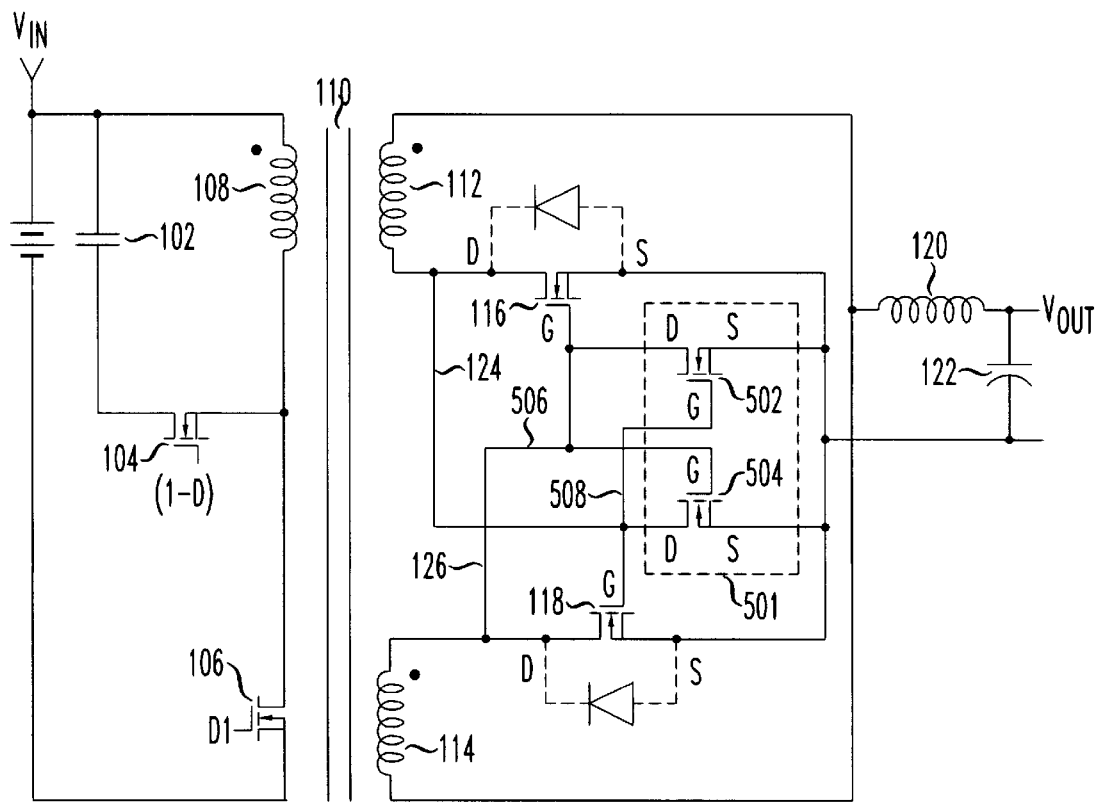
FIG. 5 is a circuit diagram of an exemplary power converter with an active clamp topology and damping circuitry, according to an exemplary embodiment of the present invention.

FIG. 5 is a circuit diagram of an exemplary power converter 500 with an active clamp topology and damping circuitry 501, according to an exemplary embodiment of the present invention. In this exemplary embodiment, the damping circuitry 501 is added to damp ringing associated with the parasitic elements in synchronous rectifiers described above with reference to FIGS. 3 and 4.

The damping circuitry 501, includes switches 502 and 504. Essentially, switches 502 and 504 form a second cross connected pair, where the drain D of switch 502 is connected to the gate G of switch 504, via line 506, and the drain D of switch 504 is connected to the gate G of switch 502, via line 508. The gate terminals of rectifier 116 and switch 502 are connected together and the gate terminals of rectifier 118 and switch 504 are also tied together.

Thus, whenever the gate G voltage of rectifier 116 is high, the gate G voltage of switch 502 is high, rendering switch 504 conducting and directly shorting the gate G terminal of rectifier 118. This action directly shorts out the gate-to-source capacitance of rectifier 118 (shown as 316 in FIG. 3) and dampens any parasitic oscillation on the gate G of rectifier 118. Therefore, rectifier 118 remains inactive (OFF) whenever rectifier 116 is active (ON), preventing any parasitic induced cross conduction and enhancing overall converter efficiency. As is readily apparent to those skilled in the art, a similar analysis can be carried out for the rectifier 118 and switch 502, showing how a positive gate voltage on rectifier 118 ensures a zero gate voltage on rectifier 116.

The damping circuit 501 is also self commutating. That is, no additional control circuitry is required to operate the active damping circuit 501. The circuit 501 uses drive signals already present in the converter 500 to also directly control the active damping circuit 501. Thus, a major efficiency advantage is achieved by circuit 501 with a minimum of added cost and complexity.

It is desirous when fabricating converter 500 to observe proper placement of the active damping switches 502 and 504. The problem of parasitic ringing arises in part because of parasitic interconnect inductance between rectifiers 116 and 118. If the interconnect length between the drain D of 116 and the gate G of 118 (and vice versa) were effectively zero, there would be no need for the active damping circuit 501. However, zero interconnect length is not possible in practical circuits. It is therefore extremely advantageous to place the switching devices 502 and 504 as close as possible to 116 and 118, respectively. A lengthy interconnect between switch 502 and rectifier 116, for example, would introduce the same parasitic inductances into the loop that switch 502 is intended to damp out. However, if proper attention is given to component placement, switches 502 and 504 then it is possible to effectuate damping of the previously described parasitic ringing.

The circuit 501 is very economical. Switches 502 and 504 can be very small when compared to rectifiers 116 and 118. For example, in a practical circuit rectifiers 116 and 118 are often realized with large die area MOSFETs packages such as a D²PAK, whereas switches 502 and 504 can be realized with much smaller SOT23 size packages. Very small transistors can be used for switches 502 and 504, because they are not required to carry any substantial power, nor are they required to charge and discharge the gates of rectifiers 116 and 118. Rather, switches 502 and 504 are only required to dissipate the energy in the parasitic resonant circuits and on the gate terminals G of rectifiers 116 and 118, which is typcially quite small. Thus, by employing the damping circuit 501 according to the present invention, a substantial improvement in overall converter efficiency is realized by adding only one or more, very small and inexpensive switches 502 and 504.

In FIG. 5, rectifiers 116 and 118 and switches 502 and 504 are shown as N-channel MOSFETs. While the use of MOSFETs provide a very economical embodiment of the active damping circuit, other switch technologies would also prove effective, as would be appreciated by those skilled in the relevant art For example, npn bipolar transistors could also be used in place of switches 502 and 504, provided that the appropriate value of base resistor were added. Other switch technologies, GaAs FETs or JFETs, for example, could also be used, provided proper drive considerations were addressed. Furthermore, the damping circuit 501 is not topology dependent and may be used with any type of self-driven synchronous rectifier. Still more, it should also be appreciated by those skilled in the relevant art, that only one switch 502 or 504 may be employed instead of the cross connected circuit 501, shown in FIG. 5, but with less efficiency.

To further appreciate the advantages of the present invention, testing of a converter substantially similar to the exemplary converter in FIG. 5 was conducted. The results of the testing yielded the essentially the following results:

| Input voltage | Output voltage | Output current | Output power |
| --- | --- | --- | --- |
| 36 V–75 V | 3.3 V | 15 A | 49.5 W |

Efficiency and power dissipation was measured for the converter 500 both with the active damping gate drive circuit 501, and without it. The results are shown in Table A below.

TABLE A

| | Input voltage | Output current | Efficiency | Power dissipation |
| --- | --- | --- | --- | --- |
| with damping circuit | 36 | 15 | 88.5% | 6.43 W |
| " | 55 | 15 | 88% | 6.75 W |
| " | 75 | 15 | 86.8 | 7.52 W |
| without damping circuit | 36 | 15 | 88 | 6.75 W |
| " | 55 | 15 | 87% | 7.4 W |
| " | 75 | 15 | 85.5 | 8.39 W |

Table B illustrates the savin$_{GS}$ in internal power dissipation afforded by the use of the active damping gate drive circuit:

TABLE B

| Input voltage | Power savings | % of total power dissipated |
| --- | --- | --- |
| 36 | 0.32 W | 4.9% |
| 55 | 0.65 W | 9.6% |
| 75 | 0.87 W | 11.5% |

Clearly, the improvement in efficiency is substantial, particularly at a 75 V input. This simple and inexpensive circuit 501 reduced internal power dissipation by 11.5%, which directly translates into better thermal performance, or perhaps more useable output power in a given thermal environment. The power savin$_{GS}$ for lower output voltage converters may be even greater.

Figure 6:
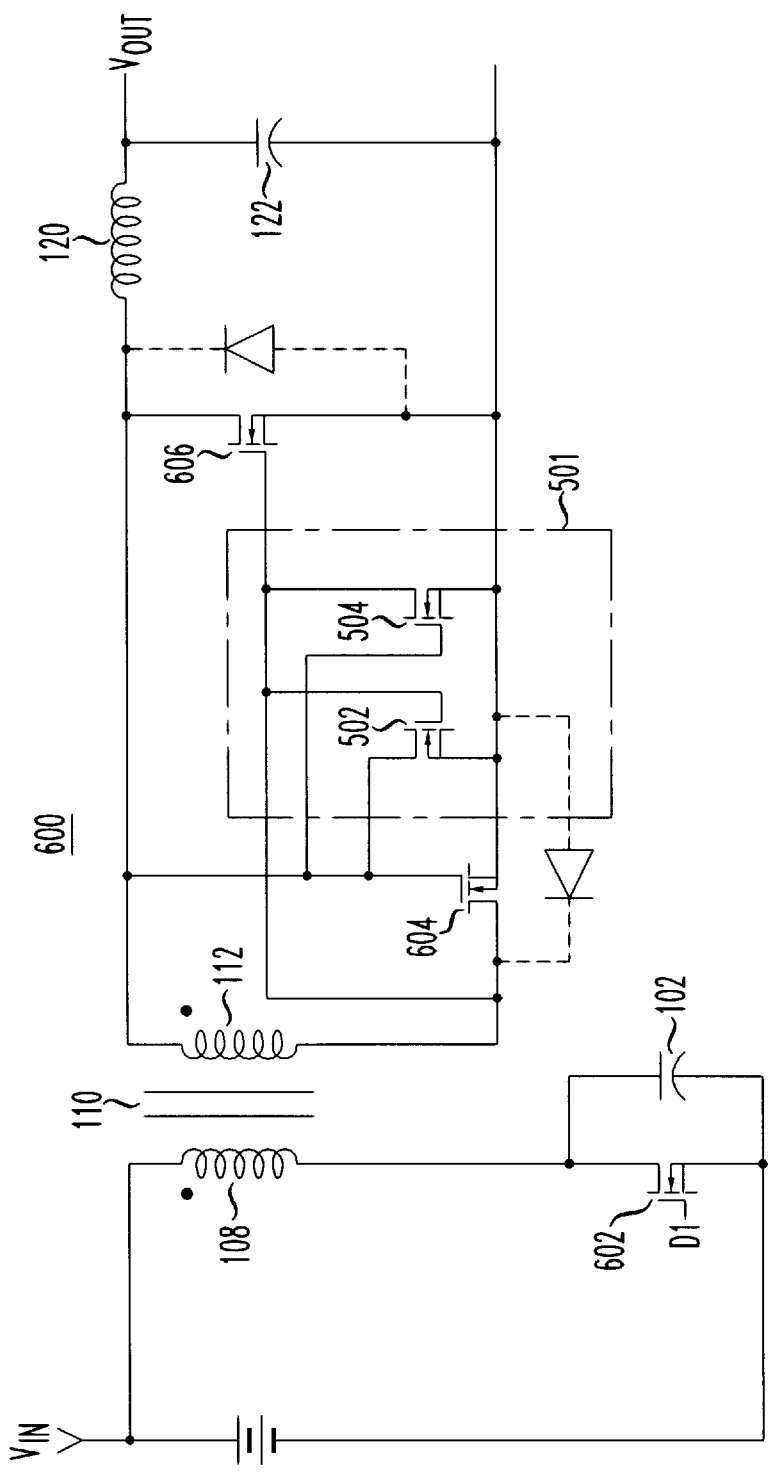
FIG. 6 is a circuit diagram showing a converter with a resonant reset forward topology including synchronous rectifiers and a damping gate drive circuit, according to an alternative exemplary embodiment of the present invention.

It is envisioned that the above described exemplary embodiment drive circuit 501 can be used with any self synchronous rectifier topology. For example, FIG. 6 is a circuit diagram showing a converter 600 with a resonant reset forward topology including synchronous rectifiers 604 and 606 and a damping date drive circuit 501, according to an alternative exemplary embodiment of the present invention. While this type of topology is generally less efficient than an active clamp topology, the described active damping circuit 501 is still applicable, as is appreciated by those skilled in the art.

Figure 7:
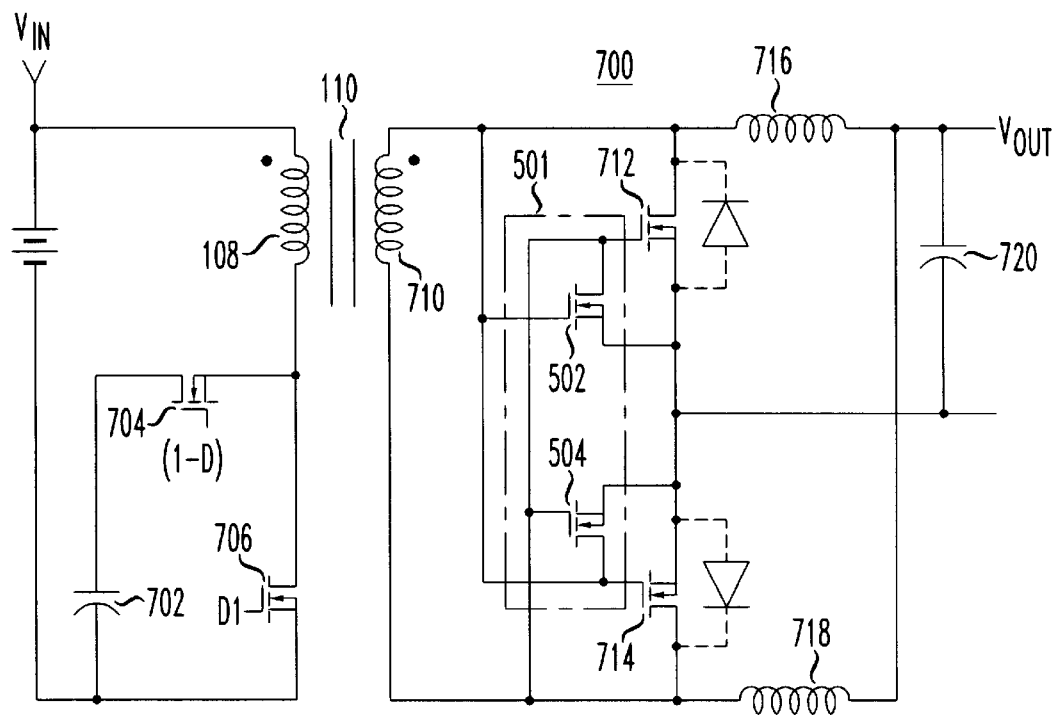
FIG. 7 is a circuit diagram of a converter with an active clamp hybridge topology including self driven synchronous rectifiers and the active damping gate drive circuit, according to alternative exemplary embodiment of the present invention.

Another topology is shown in FIG. 7, which is a circuit diagram of a converter 700 with an active clamp hybridge topology including self driven synchronous rectifiers 712 and 714 and the active damping gate drive circuit 501, according to alternative exemplary embodiment of the present invention. The converter 700 is simply an active clamp front end (capacitor 702 and MOSFETs 704 and 706) with a current doubler rectifier circuit configured as self driven synchronous rectifiers 712, 714.

Figure 8:
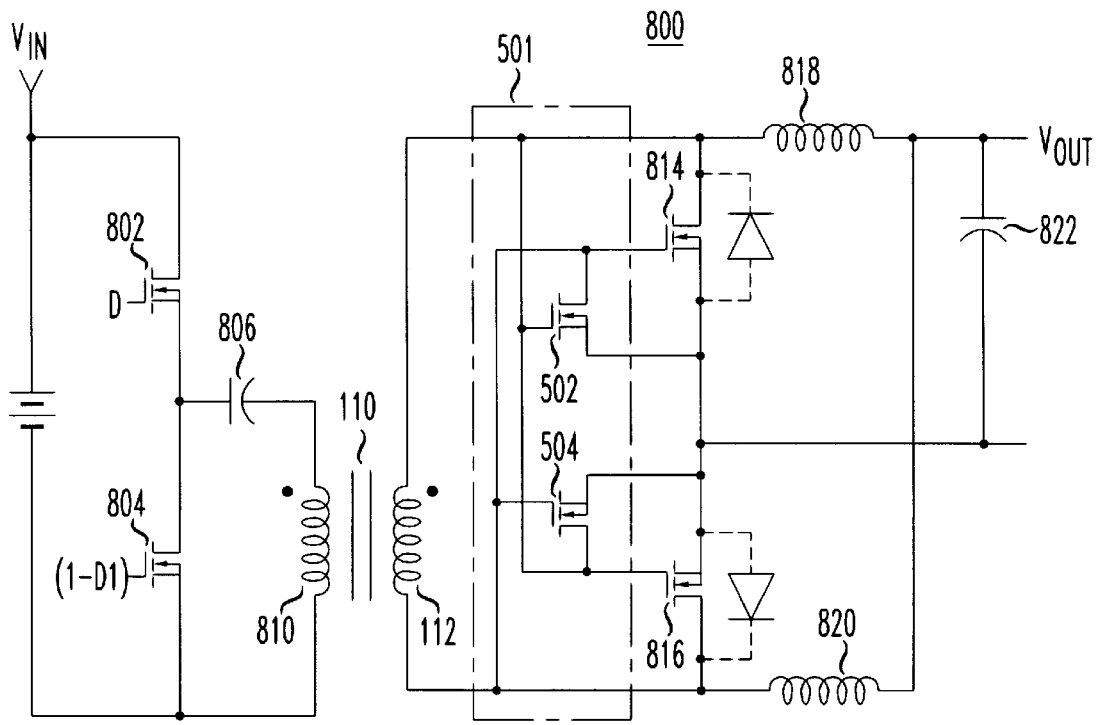
FIG. 8 is a circuit diagram of an asymmetrical half bridge converter including a hybridge rectifier and self driven synchronous rectifiers, according to alternative embodiment of the present invention.

Still another topology is shown in FIG. 8, which illustrates a circuit diagram of an asymmetrical half bridge converter 800 including a hybridge rectifier with self driven synchronous rectifiers 814 and 816, according to alternative embodiment of the present invention. The active damping gate drive circuit 501 could be used to improve the performance of this converter 800.

Figure 9:
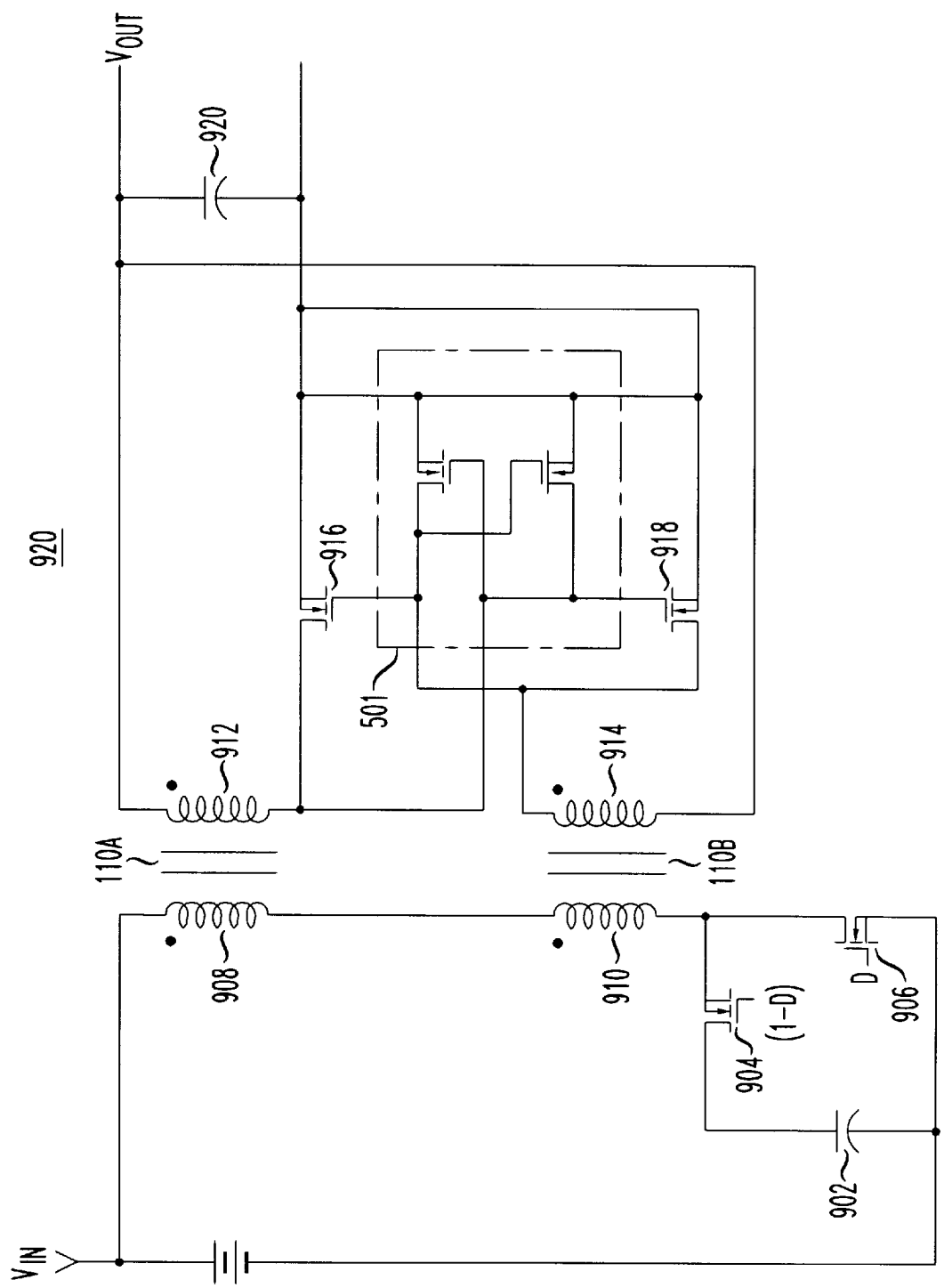
FIG. 9 is a circuit diagram of a converter with two transformers, according to still another alternative exemplary embodiment of the present invention.

FIG. 9 is a circuit diagram of a converter 900 with two transformers 110A and 110B, according to still another alternative exemplary embodiment of the present invention. The gate drive signals for the synchronous rectifiers 916 and 918 of FIG. 9 are identical to those of FIG. 5, and as such the principles of the active damping gate drive circuit 501 apply equally. In addition, the active damping gate drive circuit 501 could be applied to the drive scheme described in U.S. Pat. No. 5,590,032 to Bowman et al., entitled *Self Synchronized Drive Circuit for a Synchronous Rectifier in a Clamped-Mode Power Converter*, issued Dec. 31, 1996, and commonly assigned (the '032 patent), incorporated herein by reference in its entirety, as would be appreciated by those skilled in the relevant art, although a specific figure is not shown. In particular, the gate drive voltage limiting FETs described '032 patent are completely compatible with the active damping gate drive circuit 501 described herein.

In summary, the active damping gate drive circuit 501 is topology independent and can be used to improve the performance of any power circuit topology employing self driven synchronous rectifiers.

For a more detailed example of alternative synchronous rectifier topologies that may employ the drive circuit 501 of the present invention, see the following patents, all incorporated herein in their entirety: (1) U.S. Pat. No. 5,528,482, to Rozman, entitled *Low Loss Synchronous Rectifier for Application to Clamped-Mode Power Converters*, issued Jun. 18, 1996 and commonly assigned; (2) U.S. Pat. No. 5,274,543 to Loftus, entitled, *Zero Voltage Switching Power Converter Circuit with Lossless Synchronous Rectifier Gate Drive*, issued Dec. 28, 1993 and commonly assigned; and (3) U.S. Pat. No. 5,291,382 to Cohen, entitled *Pulse Width Modulated DC/DC Converter With Reduced Ripple Current Component Stress and Zero Voltage Switching Capability*, issued Mar. 1, 1994.

While preferred embodiments have been set forth, various modifications, alterations, and changes may be made without departing from the spirit and scope of the present invention as defined in the specification and in the appended claims.

What is claimed is:

1. A method of damping unwanted ringing in self-driven synchronous rectifiers including first and second self-driven synchronous devices each having respective activation terminals, comprising:
   (a) activating a first switching device to dampen any unwanted ringing on said activation terminal of said second self-driven synchronous device at a first time when said first self-driven synchronous device is active and said second self-driven synchronous device is inactive; and
   (b) activating said second self-driven synchronous device at a second time when said first self-driven synchronous device is inactive.

2. The method of claim 1 further comprising activating a second switching device to dampen any unwanted ringing on said activation terminal of said first self-driven synchronous device at said second time when said first self-driven synchronous device is inactive.

3. The method of claims 1 and 2 wherein said first and second switching devices are transistors.

4. The method of claim 1 wherein said first and second switching devices are MOSFETs.

5. The method of claim 1 wherein said first and second self-driven synchronous devices are transistors.

6. The method of claim 1 wherein said first and second self-driven synchronous devices are MOSFET devices.

7. The method of claim 1 wherein said second self-driven synchronous device is dampened by shorting said activation terminal of said second self-driven synchronous rectifier when said first switching device conducts.

8. The method of claim 2 wherein said self-driven synchronous device is dampened by shorting said activation terminal of said first self-driven synchronous when said second switching device conducts.

9. A power converter with improved efficiency and dampened ringing, comprising:
   self-driven synchronous rectifiers comprising first and second self-driven synchronous devices each having respective activation terminals; and
   a switching device, coupled to said self-driven synchronous rectifiers, activated at a time when said first self-driven synchronous device is active and said second self-driven synchronous device is inactive to dampen any unwanted ringing on said activation terminal of said second self-driven synchronous device.

10. The power converter of claim 9 further comprising:
    a second switching device, coupled to said self-driven synchronous rectifiers, activated at a time when said second self-driven synchronous device is active and said first self-driven synchronous device is inactive to dampen any unwanted ringing on said activation terminal of said first self-driven synchronous device.

11. The power converter of claims 9 and 10 wherein said switching devices are transistors.

12. The power converter of claims 9 and 10 wherein said switching devices are MOSFETs.

13. The power converter of claim 9 wherein said first and second self-driven synchronous devices are transistors.

14. The power converter of claim 9 wherein said first and second self-driven synchronous devices are MOSFETs.

15. The power converter of claim 9 wherein said second self-driven synchronous device is dampened by shorting said activation terminal of said second self-driven synchronous rectifier when said switching device conducts.

16. The power converter of claim 10 wherein said first self-driven synchronous device is dampened by shorting said activation terminal of said first self-driven synchronous when said second switching device conducts.

17. A circuit for damping unwanted ringing in self-driven synchronous rectifiers, comprising:
    self-driven synchronous rectifiers comprising first and second self-driven synchronous rectifiers each having respective gate terminals; and
    means, coupled to said self-driven synchronous rectifiers, for conducting at a time when said first self-driven synchronous rectifier is active and said second self-driven synchronous rectifier is inactive to dampen any unwanted ringing on said gate terminal of said second self-driven synchronous device.

18. The circuit of claim 17 further comprising second means, coupled to said self-driven synchronous rectifiers, for conducting at a time when said second self-driven synchronous rectifier is active and said first self-driven synchronous rectifier is inactive to dampen any unwanted ringing on said gate terminal of said first self-driven synchronous device.

19. The circuit of claim 17 wherein said first and second self-driven synchronous rectifiers are cross connected.

20. The circuit of claim 18 wherein said means and second means are switching devices having activation terminals, said activation terminal of said means connected directly to said activation terminal of said first self-driven synchronous rectifier and said activation terminal of said second means connected directly to said activation terminal of said second self-driven synchronous rectifier.

21. A power converter, comprising:
    a primary side power circuit for receiving an input voltage;
    a secondary side power circuit, coupled to said primary side power circuit, for supplying an output voltage, comprising:
      first and second synchronous rectifiers each having a source, drain and gate, said first and second synchronous rectifiers are coupled together such that said drain of said first synchronous rectifier is coupled to said gate of said second synchronous rectifier and said drain of said second synchronous rectifier is coupled to said gate of said first synchronous rectifier; and
      a damping drive circuit coupled to said first and second synchronous rectifiers comprising:
        first and second switches, each having a source, drain and gate, said first and second switches are coupled together, such that said drain of said first switch is coupled to said gate of said second switch and said drain of said second switch is coupled to said gate of said first switch, wherein said first switch is active when said first synchronous rectifier is active and said second switch is active when said second synchronous rectifier is active.

* * * * *